United States Patent
Gareau et al.

(10) Patent No.: US 11,916,661 B2
(45) Date of Patent: Feb. 27, 2024

(54) DISTRIBUTING TIMING OVER METRO TRANSPORT NETWORKING

(71) Applicant: Ciena Corporation, Hanover, MD (US)

(72) Inventors: Sebastien Gareau, Ottawa (CA); Andrew McCarthy, Kanata (CA)

(73) Assignee: Ciena Corporation, Hanover, MD (US)

( * ) Notice: Subject to any disclaimer, the term of this patent is extended or adjusted under 35 U.S.C. 154(b) by 999 days.

(21) Appl. No.: 16/454,807

(22) Filed: Jun. 27, 2019

(65) Prior Publication Data

US 2020/0412471 A1 Dec. 31, 2020

(51) Int. Cl.
*H04J 3/06* (2006.01)
*G06F 11/16* (2006.01)

(52) U.S. Cl.
CPC ........ *H04J 3/0673* (2013.01); *G06F 11/1679* (2013.01); *H04J 3/0667* (2013.01); *H04J 3/0697* (2013.01)

(58) Field of Classification Search
USPC .............................................. 370/336, 236.2
See application file for complete search history.

(56) References Cited

U.S. PATENT DOCUMENTS

| | | | |
|---|---|---|---|
| 8,848,533 B1 | 9/2014 | Stuart et al. | |
| 8,867,913 B2 | 10/2014 | Gareau et al. | |
| 8,971,352 B2 * | 3/2015 | Jost | H04J 3/0697 370/465 |
| 9,300,421 B2 * | 3/2016 | Yang | H04L 1/0042 |
| 10,097,480 B2 | 10/2018 | Gareau et al. | |
| 2008/0075122 A1 * | 3/2008 | Fourcand | H04J 3/0605 370/503 |
| 2010/0034191 A1 * | 2/2010 | Schulz | G01D 21/00 370/350 |
| 2010/0238836 A1 | 9/2010 | Diab et al. | |
| 2011/0019681 A1 | 1/2011 | Gazier et al. | |
| 2013/0266312 A1 | 10/2013 | Prakash et al. | |
| 2013/0308943 A1 | 11/2013 | Young et al. | |
| 2015/0055664 A1 | 2/2015 | Kanonakis et al. | |
| 2016/0323164 A1 | 11/2016 | Cao | |

(Continued)

FOREIGN PATENT DOCUMENTS

| WO | 2019/071598 A1 | 4/2019 |
|---|---|---|
| WO | 2020/108202 A1 | 6/2020 |

OTHER PUBLICATIONS

OIF Optical Internetworking Forum, IA OIF-FLEXE-02.0, Flex Ethernet 2.0 Implementation Agreement, Jun. 22, 2018, pp. 1-51.

(Continued)

*Primary Examiner* — Alpus Hsu
*Assistant Examiner* — Hooman Houshmand
(74) *Attorney, Agent, or Firm* — Baratta Law PLLC; Lawrence A. Baratta, Jr.

(57) ABSTRACT

Systems and methods for timing over a Metro Transport Networking (MTN) path include detecting a specific block in a stream of blocks, wherein each block is encoded based on a line code, and sampling an output of a clock to determine a timestamp reference based on detection of the specific block, and transmitting timing information based on the timestamp reference. The specific block can be a control block. The timing information can be transmitted via a Precision Time Protocol (PTP) message. The timing information can be transmitted via a plurality of subsequent specific blocks.

19 Claims, 6 Drawing Sheets

(56) References Cited

U.S. PATENT DOCUMENTS

| | | | | |
|---|---|---|---|---|
| 2017/0093757 A1* | 3/2017 | Gareau | ............... | H04L 43/0864 |
| 2018/0375800 A1* | 12/2018 | Gareau | ................ | H04L 43/106 |
| 2019/0173856 A1* | 6/2019 | Gareau | ............... | H04L 63/0876 |
| 2020/0244383 A1* | 7/2020 | He | ............................ | H04J 3/06 |

OTHER PUBLICATIONS

Shew et al., International Telecommunication Union, Telecommunication Standardization Sector, SG15-TD352R1/WP3, Study Group 15, Study Period 2017-2020, Report of Q12/15 and Q14/15 Jan. 2019 Wuhan Joint Interim Meeting, p. 1-33.

Han et al., International Telecommunication Union, Telecommunication Standardization Sector, SG15-C1490, Study Group 15, Study Period 2017-2020, Proposal for MTN synchronization, pp. 1-2.

ZTE Corporation, MTN layer structure, Jan. 21-25, 2019, Study Group: 15 Working Party: 3 Intended type of document: WD 25, pp. 1-7.

Nokia USA, MTN Architecture Considerations, Jan. 21-25, 2019, Study Group: 15 Working Party: 3 Intended type of document: WD 63, pp. 1-5.

China Mobile, FiberHome, The consideration on Management Aspects for G.mtn, Jan. 21-25, 2019, Study Group: 15 Working Party: 3 Document WD1214-68, pp. 1-3.

Rapporteurs, MTN description and issues, Jan. 21-25, 2019, Study Group: 15 Working Party: 3 Intended type of document: WD 73, pp. 1-8.

China Mobile, FiberHome, The consideration of architecture and functional block characteristics of G.mtn, Jan. 21-25, 2019, Study Group: 15 Working Party: 3 Document WD1214-69, pp. 1-3.

Oct. 22, 2020, International Search Report and Written Opinion for International Application No. PCT/US2020/039283.

Z. Han et al., International Telecommunication Union, "Text proposal for POH overhead description in draft G.mtn", Telecommunication Standardization Sector, SG15-C1338, Study Group 15, Jul. 1-12, 2019, pp. 1-9.

M. Hajduczenia, ZTE Corporation, "64b/66b line code", IEEE-SA, vol. 802.3bn, Mar. 16, 2013, pp. 1-23.

N. Tracy et al., OIF, "Flex Ethernet Implementation Agreement", Aug. 4, 2015, pp. 1-2.

R. Li et al., Huawei Technologies Co., Ltd., "G.mtn path layer OAM and format overall consideration", Study Group 15, Apr. 8-12, 2019, pp. 1-4.

* cited by examiner

DISTRIBUTING TIMING OVER METRO TRANSPORT NETWORKING

FIELD OF THE DISCLOSURE

The present disclosure generally relates to timing in networks. More particularly, the present disclosure relates to systems and methods for distributing timing over Metro Transport Networking (MTN).

BACKGROUND OF THE DISCLOSURE

MTN (metro transport networking, G.mtn) is being developed in the International Telecommunication Union (ITU) as G.mtn "Interfaces for a metro transport network." MTN has also been historically called "Flexible Ethernet (FlexE) switching" or Sliced packet Networking (SPN). MTN is a layer 1 transport technology similar to Optical Transport Network (OTN). MTN is being developed for 5G transport, and MTN fundamentally utilizes Ethernet and 64b/66b blocks. 64b/66b is a line code that transforms 64-bit data to a 66-bit line code to provide enough state changes to allow reasonable clock recovery and alignment of the data stream at the receiver. 64b/66b was defined by the IEEE 802.3 working group as part of the IEEE 802.3ae-2002 amendment which introduced 10 Gbit/s Ethernet, the contents of which are incorporated by reference. An output of 64b/66b encoding is a 66b block. The driving application for MTN is 5G mobile transport, and there is a need for timing support in such MTN networks, utilizing the 66b blocks.

There are existing timing techniques including Precision Time Protocol (PTP) which was defined in the IEEE 1588-2002 standard, officially entitled "Standard for a Precision Clock Synchronization Protocol for Networked Measurement and Control Systems," and updated as PTP version 2 in IEEE 1588-2008. This approach utilizes Ethernet packets, i.e., PTP messages. The drawback of this approach is that the time event is associated with a Start of Packet (SOP) of a PTP message. Any circuitry in a typical layer 1 transport device involved with timing, must be packet-aware and must implement a fairly sophisticated multi-level classifier to identify (Ethernet or Internet Protocol (IP)) packets that represent timing information.

Flexible Ethernet (FlexE) is described in the Optical Internetworking Forum (OIF) "Flex Ethernet 2.0 Implementation Agreement," IA# OIF-FLEXE-02.0, Jun. 22, 2018, the contents of which are incorporated by reference. FlexE is considered a section layer for G.mtn. PTP over FlexE is now defined in the OIF-FLEXE-02.0. Also, PTP over FlexE is described in commonly-assigned U.S. Pat. No. 10,097,480, issued Oct. 9, 2018, and entitled "Time transfer systems and methods over flexible ethernet," the contents of which are incorporated by reference. The disadvantage of implementing timing at the FlexE layer is that it applies to the whole interface, i.e., all the clients. There is no way of implementing multiple PTP timing islands that are associated with the various clients (paths) sharing the FlexE section layer. Also, the timing information at the section layer cannot be switched along with the client paths, as part of the clients' characteristic information. G.mtn is introducing a path layer and timing information associated with the path can be layer 1 (circuit) switched. Another disadvantage is that the time reference of FlexE (based on a multi-frame) is periodic, which bounds the amount of sync messages.

BRIEF SUMMARY OF THE DISCLOSURE

In an embodiment, an apparatus includes circuitry configured to detect a specific block based on a line code and to sample a clock to determine a timestamp reference based on detection of the specific block; and circuitry configured to transmit timing information based on the timestamp reference. The specific block can be a control block. The specific block can be a control block that has an O-code. The specific block can be a control block that is used for Operations, Administration, and Maintenance (OAM) and has an O-code. The circuitry configured to transmit the timing information can utilize a Precision Time Protocol (PTP) message. The circuitry configured to transmit the timing information can utilize a Precision Time Protocol (PTP) message sent via a packet taking a plurality of blocks. The circuitry configured to transmit the timing information can utilize a plurality of subsequent specific blocks. The stream of blocks can be received from a communicatively coupled second apparatus. The apparatus can further include circuitry configured to receive corresponding timing information from a second device and to perform a calculation to determine a time difference relative to the second device. The transmitted timing information can be utilized by a second device to determine a time difference relative to the clock. The stream of blocks is a Metro Transport Networking (MTN) stream.

In another embodiment, a node includes a clock; and a circuit configured to detect a specific block based on a line code and sample the clock to determine a timestamp reference based on detection of the specific block, and cause transmission of timing information based on the timestamp reference. The specific block can be a control block. The specific block can be a control block that has an O-code. The specific block can be a control block that is used for Operations, Administration, and Maintenance (OAM) and has an O-code. The circuit can be further configured to transmit the timing information utilizes a Precision Time Protocol (PTP) message. The circuit can be further configured to transmit the timing information utilizes a Precision Time Protocol (PTP) message sent via a packet taking a plurality of blocks. The circuit can be further configured to transmit the timing information utilizes a plurality of subsequent specific blocks.

In a further embodiment, a method includes detecting a specific block based on a line code and sampling a clock to determine a timestamp reference based on detection of the specific block; and transmitting timing information based on the timestamp reference. The specific block can be a control block. The specific block can be a control block that has an O-code. The specific block can be a control block that is used for Operations, Administration, and Maintenance (OAM) and has an O-code. The method can further include transmitting the timing information via a Precision Time Protocol (PTP) message. The method can further include transmitting the timing information via a plurality of subsequent specific blocks.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for distributing timing over Metro Transport Networking (MTN). As described herein, MTN (also referred to herein as G.mtn) is a layer 1 transport technology based on FlexE and similar OTN. MTN is being presented for various transport applications, including 5G mobile transport. Such applications have a requirement for native timing distribution over MTN. The present disclosure provides an approach of transferring PTP/timing using G.mtn. With the G.mtn approach, 66b blocks can be circuit switched in layer one transport nodes. In addition to G.mtn, the present disclosure can provide an approach for transferring PTP/timing over any layer one technique that utilizes 66b blocks (or other types of blocks such as 257b blocks from 256b/257b encoding).

The required information for the transfer of precise time is (1) a time reference point, or "significant instant" or "timestamp reference" to which timing information can be related, (2) the timing information itself, and (3) a measure of the delay it takes to transfer the timing information between two points, e.g., two devices in a network. The transfer of the precise time can be used to adjust a clock. The two devices in the network can be two network nodes or network elements. Other embodiments are also contemplated, such as modules or circuit packs.

The present disclosure utilizes a 66b block from 64b/66b encoding (or another sized block in a different line code) specifically for the time reference point. In an embodiment, the 66b block is an existing Operations, Administration, and Maintenance (OAM) block with an Operational code (O-code) defined specifically for timing transfer or an already defined O-code. For example, the 66b block for timing can be referred to as an MTN Synchronization Message Channel (MSMC), which is similar to an OTN Synchronization Message Channel (OSMC) and Ethernet Synchronization Message Channel (ESMC).

The timing information itself is a timestamp value, and this can be transported in the 66b blocks. For example, a timestamp value may be 10 bytes which would require transport in multiple 66b blocks. Alternatively, the timing information can be transported in a standard PTP message such as at the Ethernet or IP layer. Finally, the measure of the delay is performed by transmission of the timing information and the time reference point between two devices. Advantageously, the 66b block for timing simplifies the time event, is efficient to add/drop/process, is client-specific, and is switchable at the 66b block level.

G.mtn

Figure 1:
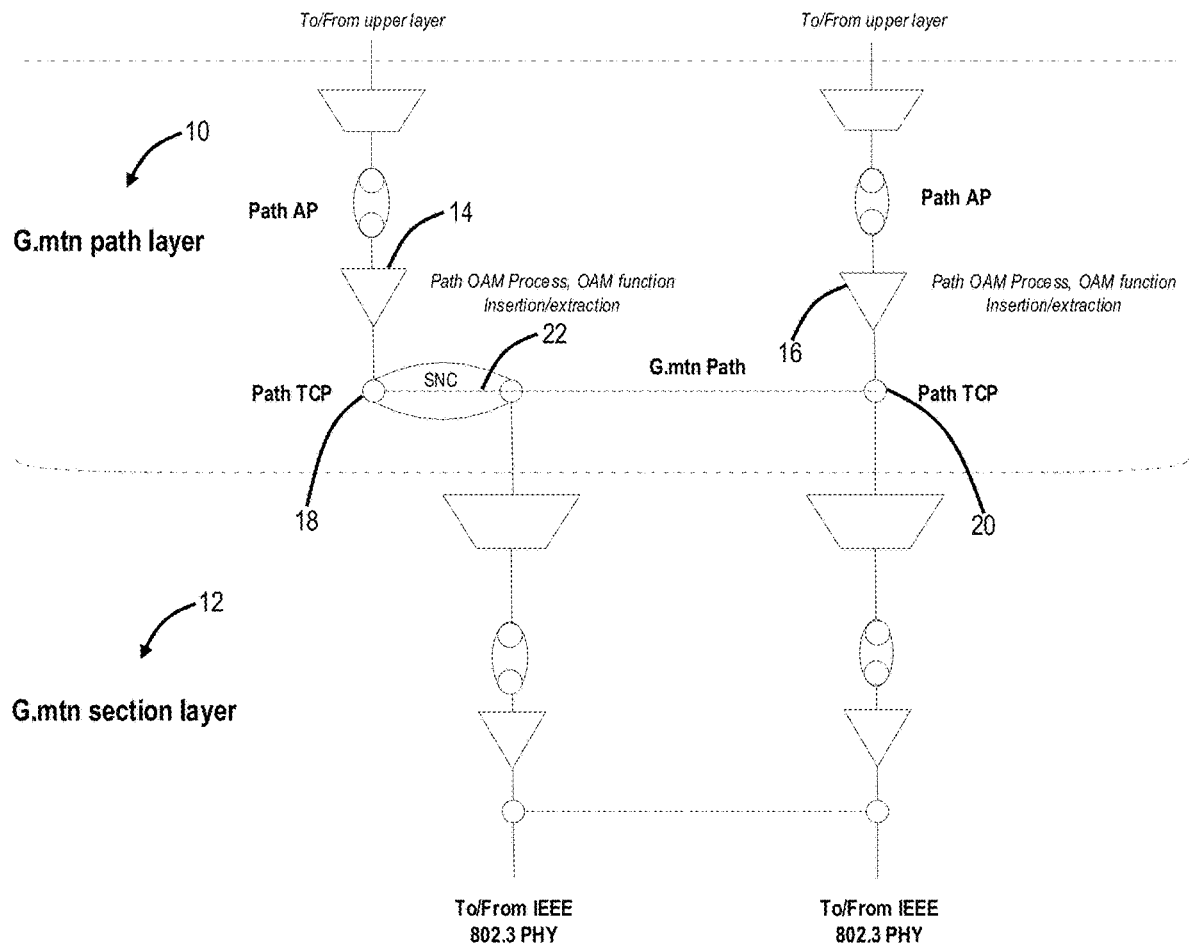
FIG. 1 is a block diagram of the G.mtn architecture functions.

FIG. 1 is a block diagram of the G.mtn architecture functions. G.mtn includes two-layer transport network with a path layer 10 and a section layer 12. The path layer 10 includes flexible connections with path OAM in 66b blocks, while the section layer will mainly describe the way to map upper 66b blocks downwards to the OIF FlexE logic, IEEE 802.3 PHY, and finally transport on the optical layer, such as Dense Wavelength Division Multiplexing (DWDM), etc.

A client signal is mapped into the G.mtn path layer 10. Since one of the G.mtn use cases is focusing on middle-haul and backhaul of the 5G mobile transport network and carry residential access and enterprise private line traffic at the same time, Ethernet traffic is the major type of client signals.

A G.mtn path layer termination function 14, 16, after a path Access Point (AP), contains the G.mtn path layer trail termination function which terminates the path monitoring of G.mtn path. Several generic processes may be assigned to the termination function, for instance, validation of connectivity integrity, assessment of transmission quality and transmission defect detection and indication. Thus, G.mtn path layer OAM processing is contained in the termination function 14, 16. As is described herein, timing is provided in the path layer 10 of the G.mtn path layer termination function 14, 16 utilizing a special 66b block or any other OAM block for timing.

A G.mtn path layer connection function 18, 20 connects path characteristic information from its ingress to its egress. By establishing a matrix connection between specific input and output, the path layer connection function 18, 20 is able to connect a specific input port and a specific output port. In the example of FIG. 1, two G.mtn path layer Termination Connection Points (TCPs)/Connection Points (CPs) are connected by a Sub Network Connection (SNC) 22 and completes the cross-connect function of G.mtn path layer.

The G.mtn section layer 12 reuses some design principles of FlexE. It should be noted that both FlexE and Physical Coding Sublayer (PCS) lower part are defined as a physical link connecting two peer nodes, which do not meet the end-to-end 5G transport network requirement, such as switching/cross-connect, end-to-end OAM, performance monitoring, fault isolation, and protection. An adaptation function is required to adapt path characteristic information into the section information that conforms to G.mtn section layer implementation, which might include functions similar to line encoding (e.g., 66b blocks), FlexE Client data rate adjust and FlexE Client mux/demux.

66b Blocks

Figure 2:
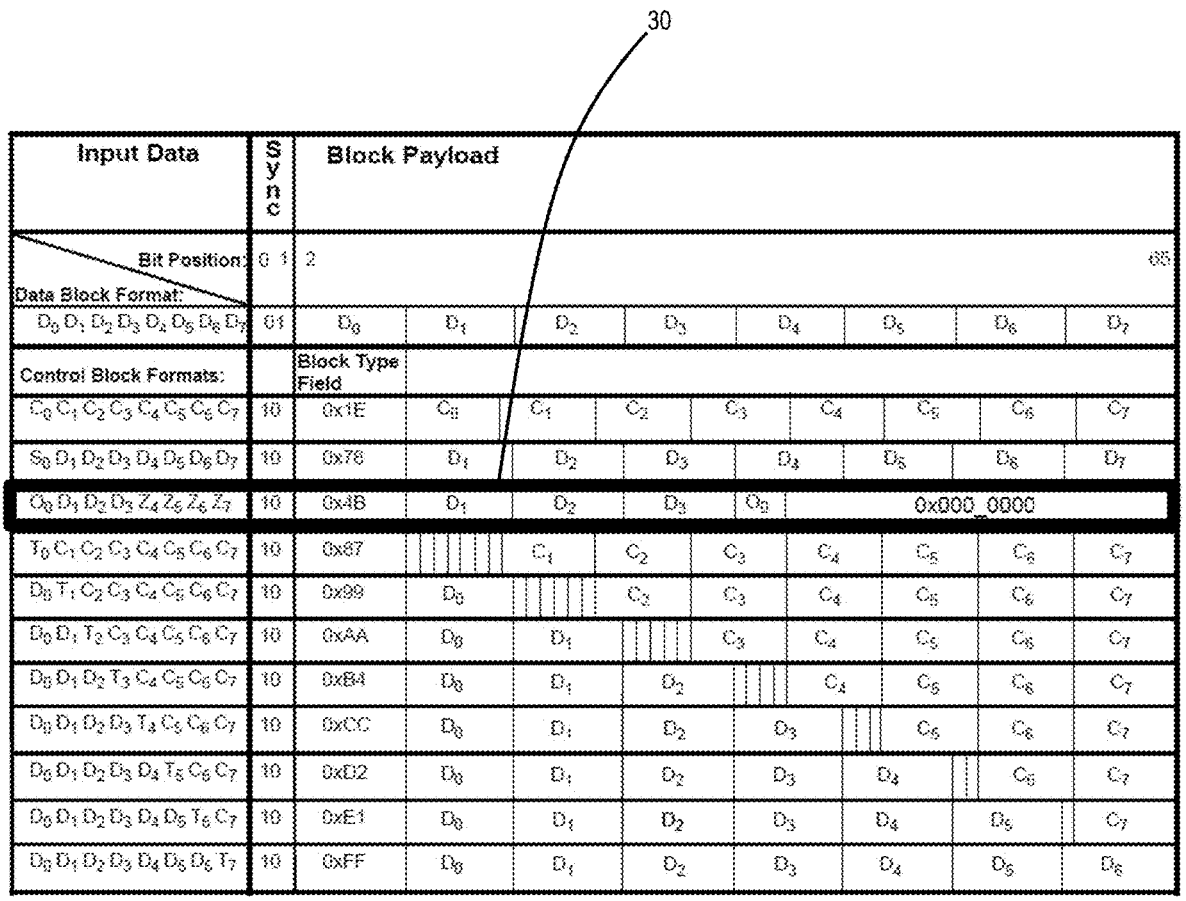
FIG. 2 is a table of 66b block formats.

FIG. 2 is a table of 66b block formats. Specifically, FIG. 2 is FIG. 82-5 in IEEE Std. 802.3-2015, the contents of which are incorporated by reference. Also, additional 66b blocks are also defined in FIG. 49-7 in IEEE 802.3-2015. Those skilled in the art will recognize the 66b blocks described herein can be any of these implementations as well as other implementations. As 64b/66b encoding suggests, 64 payload bits are encoded as a 66-bit entity (a "66b block"). The first two bits of a block are the synchronization header (sync header or SH). 66b blocks are either data blocks or control blocks. The sync header is 01 for data blocks and 10 for control blocks. Thus, there is always a transition between the first two bits of a block. The use of the sync headers guarantees a bit transition every 66 bits, which means that a continuous stream of 0s or 1s cannot be valid data. It also allows easier clock/timer synchronization, as a transition must be seen every 66 bits.

The remainder of the 66b block after the synch header contains the payload. The payload is scrambled, and the sync header bypasses the scrambler. Therefore, the sync header is the only position in the block that is always guaranteed to contain a transition. This feature of the code is used to obtain block synchronization. Data blocks contain eight data characters, D0 through D7. Control blocks begin with an 8-bit block type field that indicates the format of the remainder of the block. For control blocks containing a Start, Terminate character, or ordered set, that character is implied by the block type field. Other control characters are encoded in a 7-bit control code. Each control block encodes eight characters.

A 66b block 30 is highlighted in FIG. 2. This is an ordered set (an ordered set is also referred to as an O-code) which is used to extend the ability to send control and status information over a link such as remote fault and local fault status. The 66b block 30 includes a control character (0x4B) followed by three data characters (D1, D2, D3) followed by four zero data characters (0x000_0000), which may be reused in MTN.

The various embodiments described herein are with reference to a 66b block, which is an output of 64b/66b encoding. That is, the 66b block is a block of bits based on a line code, which in this case is 64b/66b encoding. There are other types of line codes, and the present disclosure equally contemplates use therein. For example, another type of line code is 256b/257b encoding. Here, 256 bits of data are encoded into 257b blocks. As described herein, the 66b block 30 can be generalized to a specific block in a line code. This could be a 66b block, a 257b block, etc. The specific type could be a control block, a control block with a specified O-code, etc.

Time Reference Point Via a 66b Block

The block type field plus the O-code encode the specific control character for the ordered set. In G.mtn, the 66b block 30 is used to transmit OAM information. There are various O-codes defined. The present disclosure utilizes the 66b block 30 as a time reference point. As described herein, the time reference point (or timing reference point or significant instant) is a time of interest where a device should sample its local clock. These samples are stored locally and/or provided to a remote device for a delay and timestamp calculation.

Advantageously, the time reference point is transmitted at layer one, the G.mtn path layer 10, as a 66b block. This is not embedded in a packet that needs to be detected at higher layer circuitry. Circuitry implementing the present disclosure does not require packet awareness, but PHY (physical) layer awareness to match a 66b pattern.

Also, the 66b block 30 is shown with the control character 0x4B and with a specific 0-code denoting it is the time reference point. Those of ordinary skill in the art will appreciate other choices are contemplated for the control character and the O-code. In fact, the 66b block can be any type of control block or data block, so long as an implementation knows a priori (predetermined) that this is being used as the time reference point. For example, the 66b block could be another OAM block or the like, e.g., a G.mtn Delay Measurement (DM) OAM block.

Transfer of Timing Information

Figure 3:
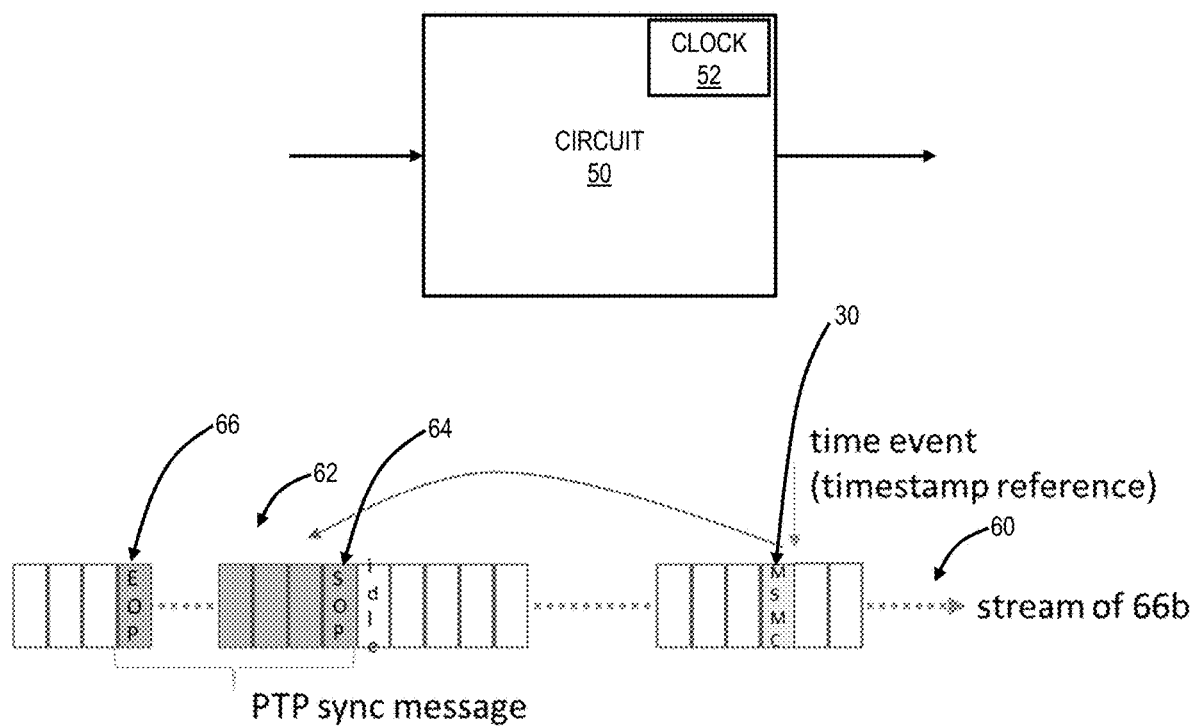
FIG. 3 is a block diagram of a circuit configured to implement timing transfer utilizing the 66b block.

The objective of the 66b block 30 is to cause a local device to sample a time of its local clock. FIG. 3 is a block diagram of a circuit 50 configured to implement timing transfer utilizing the 66b block 30. The circuit 50 may include or be connected to a local clock 52. In an embodiment, the circuit 50 is at a node or network element, such as in an Ethernet, FlexE, and/or G.mtn network. The circuit 50 is configured to process a stream 60 of 66b blocks.

The circuit 50 can detect the 66b block 30, labeled as the MSMC in FIG. 3. The 66b block 30 can be periodically inserted in the stream 60 or as needed to perform a PTP synchronization between the local clock 52 and another local clock of a remote device. Once the circuit 50 detects the 66b block 30, the local clock 52 has its time sampled, i.e., the timestamp reference is determined.

Next, there is a requirement to send the timestamp reference as the timing information to the remote device. The timestamp reference is a timestamp value. In an embodiment, such as illustrated in FIG. 3, the timestamp reference can be sent in a standard PTP message 62 (Ethernet or IP layer). In FIG. 3, the PTP message 62 takes a plurality of 66b blocks in the stream 60 with a first block 64 denoted as SOP (Start of Packet), and a last block 66 denoted as EOP (End of Packet). Here, the PTP message 62 can be constructed via the circuit 50 or layer two processing circuitry.

In another embodiment, the timestamp reference can be sent via one or more subsequent 66b blocks 30. As noted in FIG. 2, the 66b block 30 does include data blocks. These data blocks may be used to carry the timestamp reference in a PTP format or some other format. The timestamp reference may take multiple 66b blocks 30, i.e., via the MTN Synchronization Message Channel (MSMC). Note, the first 66b block 30 is used to trigger the timestamp reference, whereas subsequent 66b blocks 30 could be used to transfer the data representing the timestamp reference.

Time Transfer Process

Figure 4:
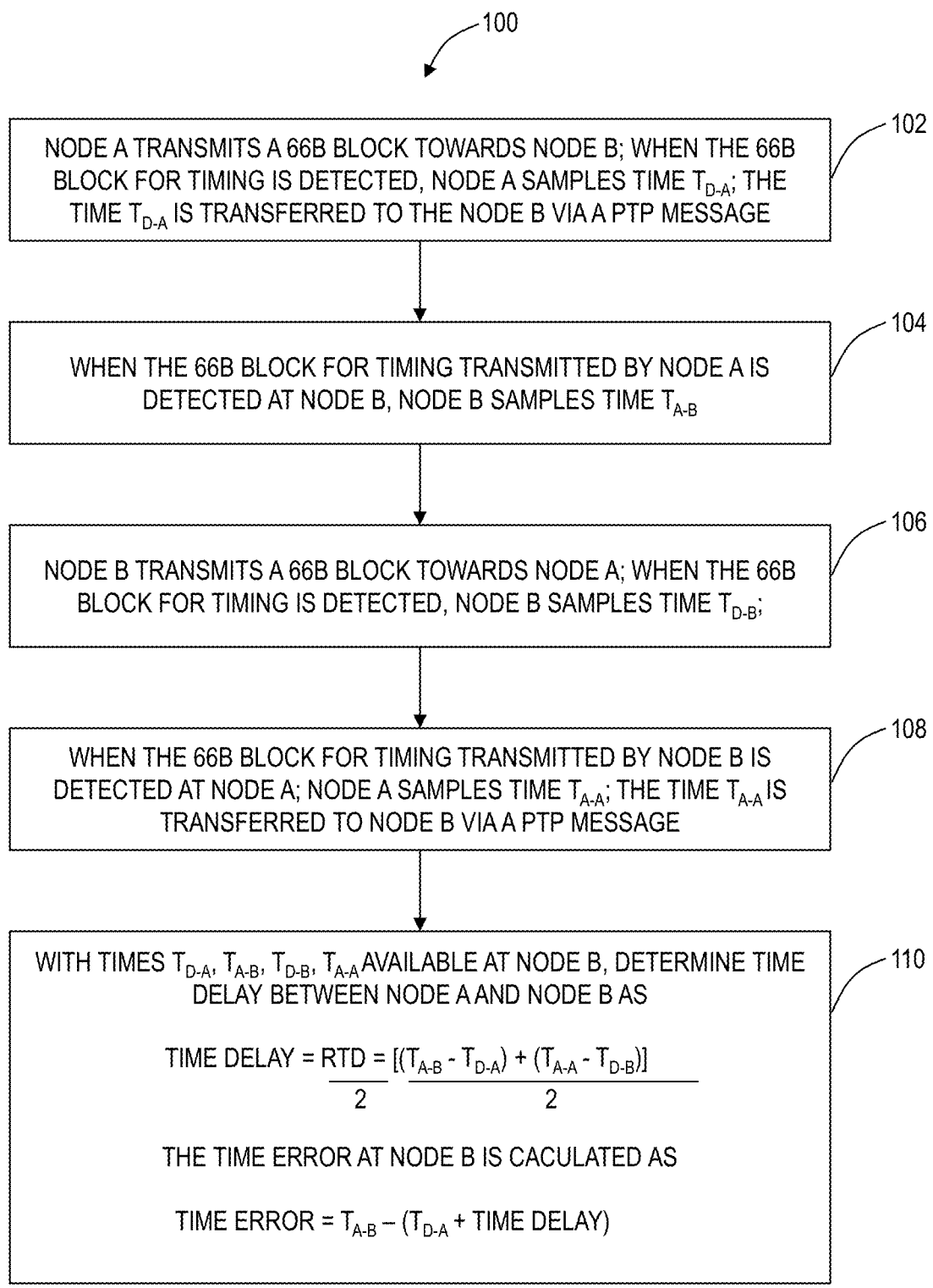
FIG. 4 is a flowchart of a time transfer process.

FIG. 4 is a flowchart of a time transfer process 100. As described herein, the time transfer process 100 uses the 66b block 30 (or equivalent) as a reference for timestamp generation. The reference can be reliably detected at given intervals. The time of detection becomes the time reference point or "significant instant" for the time transfer process 100. The time reference point is used to indicate an Arrival Time $T_A$ and Departure Time $T_D$. Also, the period for a time reference point in the time transfer process 100 must allow for the transfer of the timing information via a synchronization message channel, which can be PTP message either as a packet or as one or more 66b blocks 30.

The time transfer process 100 is described between two nodes—node A and node B utilizing 66b blocks for transmission therebetween, e.g., G.mtn, FlexE, Ethernet, etc. Of course, other types of blocks in different line codes are also contemplated. The node A transmits a 66b block towards node B; when the 66b block for timing is detected, node A samples time $T_{D-A}$; the time $T_{D-A}$ is transferred to the node B via a PTP message (step 102). When the 66b block for timing transmitted by node A is detected at node B, node B samples time $T_{A-B}$ (step 104). Node B transmits a 66b block towards node A; when the 66b block for timing is detected, node B samples time $T_{D-B}$ (step 106). When the 66b block for timing transmitted by node B is detected at node A; node A samples time $T_{A-A}$; the time $T_{A-A}$ is transferred to node B via a PTP message (step 108). With times $T_{D-A}, T_{A-B}, T_{D-B}, T_{A-A}$ available at node B, the time delay between node A and node B is determined as:

$$\text{TIME\_DELAY} = \frac{RTD}{2} = \frac{[(T_{A-B} - T_{D-A}) + (T_{A-A} - T_{D-B})]}{2}$$

Where RTD is the Round Trip Delay, which is $[(T_{A-B}-T_{D-A})+(T_{A-A}-T_{D-B})]$. The time error at node B is calculated as:

TIME_ERROR=$T_{A-B}$-($T_{D-A}$+TIME_DELAY)  (step 110).

Also, the aforementioned process 100 can be adapted in a single direction, as opposed to RTD. Further, control algorithms and fixed, known offsets can then be employed to minimize the time error.

Timestamp Generation Process

Figure 5:
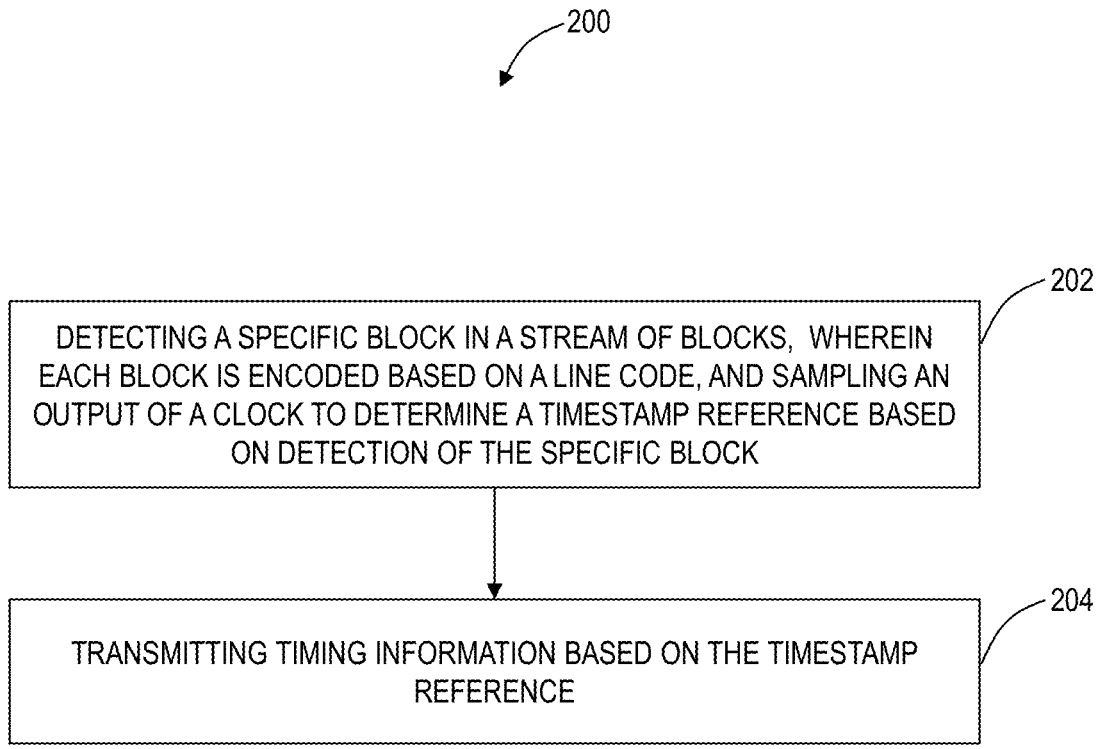
FIG. 5 is a flowchart of a timestamp generation and transmission process.

FIG. 5 is a flowchart of a timestamp generation and transmission process 200. The process 200 includes detecting a specific block in a stream of blocks, wherein each block is encoded based on a line code, and sampling an output of a clock to determine a timestamp reference based on detection of the specific block (step 202), and transmitting timing information based on the timestamp reference (step 204). As described herein, the specific block can be a 66b block based on the 64b/66b line code, a 257b block based on the 256b/257b line code, or the like.

The specific block can be a control block that is predetermined to cause the sample. The specific block can be a control block that has an O-code predetermined to cause the sample. The specific block can be a control block that is used for Operations, Administration, and Maintenance (OAM) and has an O-code predetermined to cause the sample.

The process 200 can further include transmitting the timing information via a Precision Time Protocol (PTP) message. The process 200 can further include transmitting the timing information utilizing a Precision Time Protocol (PTP) message sent via a packet taking a plurality of blocks. The process 200 can further include transmitting the timing information via a plurality of subsequent specific blocks. That is, a stream of the specific blocks can be used as a synchronization message channel.

The stream of blocks can be received from a communicatively coupled second apparatus, e.g., the circuitry can receive a stream of blocks. The process 200 can further include receiving corresponding timing information from a second device and performing a calculation to determine a time difference relative to the second device. The transmitted timing information can be utilized by a second device to determine a time difference relative to the clock. The stream of blocks can be a Metro Transport Networking (MTN) stream.

In another embodiment, an apparatus includes circuitry configured to detect a specific block in a stream of blocks, wherein each block is encoded based on a line code, and to sample an output of a clock to determine a timestamp reference based on detection of the specific block; and circuitry configured to transmit timing information based on the timestamp reference.

In a further embodiment, a node includes a clock; and a circuit configured to detect a specific block in a stream of blocks, wherein each block is encoded based on a line code, and sample an output of the clock to determine a timestamp reference based on detection of the specific block, and cause transmission of timing information based on the timestamp reference.

Example PHY Embodiment

Figure 6:
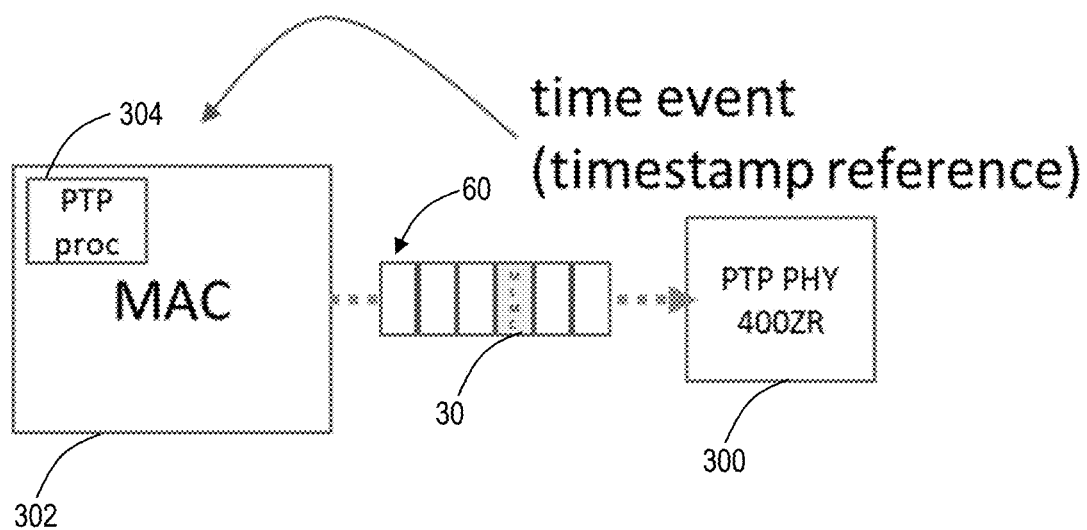
FIG. 6 is a block diagram of an example PTP PHY connected to a Media Access Control (MAC) device with a PTP processor.

FIG. 6 is a block diagram of an example PTP PHY 300 connected to a Media Access Control (MAC) device 302 with a PTP processor 304. The PTP PHY 300 can be any physical device and does not necessarily have packet awareness (but does require 66b block awareness). For example, the PTP PHY 300 can be a 400ZR coherent module. The MAC device 302 can be a packet processing device, e.g., a 66b block switch (G.mtn, FlexE, etc.). The MAC device 302 can send the 66b block 30 and the PTP PHY 300 can monitor for a pattern match (to the 66b block 30) and detect the time when the 66b block 30 leaves the PTP PHY 300 interface (i.e., at a latest possible point in the data path). This corresponds to the first step, i.e., the time reference point or the significant instance. This PTP PHY 300 does not require any packet awareness and can be a simple pattern match algorithm (66b awareness). The significant time event is the timestamp point of reference, and then the MAC device 302 can generate a follow-up sync message with the timestamp information.

Figure 7:
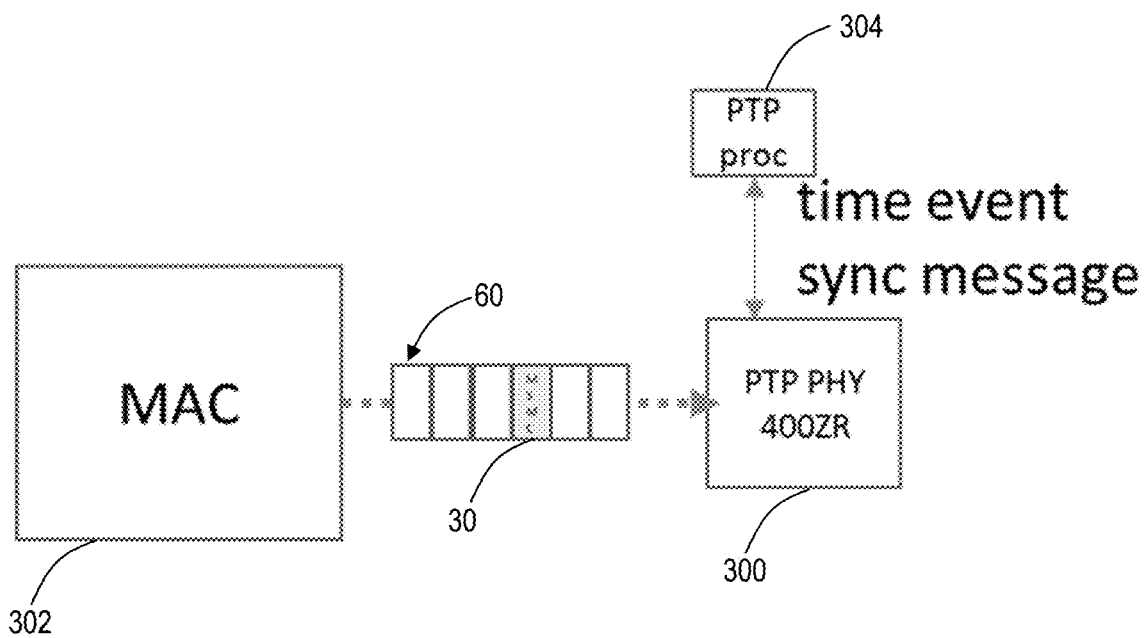
FIG. 7 is a block diagram of an example PTP PHY connected to a PTP processor and to a MAC device.

FIG. 7 is a block diagram of an example PTP PHY 300 connected to a PTP processor 304 and to a Media Access Control (MAC) device 302. FIG. 7 is another example with a similar application to FIG. 6, but in this example, the layer 1 PTP sync message can be extracted/inserted in the PTP PHY 300 or coherent modem (e.g., 400ZR). It can work with an external PTP processor 304 (boundary clock) and does not rely on a layer 2 or layer 3 packet switch. This approach can be applied to traditional transponders/muxponders as well.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An apparatus comprising:
   circuitry configured to detect a specific block in transmitted blocks, wherein each block of the transmitted blocks is encoded based on a line code, and to sample an output of a clock to determine a timestamp reference based on detection of the specific block that has an operational code (O code) denoting timing transfer; and
   circuitry configured to transmit timing information based on the timestamp reference.

2. The apparatus of claim 1, wherein the specific block is a control block.

3. The apparatus of claim 1, wherein the specific block is a control block that is used for Operations, Administration, and Maintenance (OAM).

4. The apparatus of claim 1, wherein the circuitry configured to transmit the timing information utilizing a Precision Time Protocol (PTP) message.

5. The apparatus of claim 1, wherein the circuitry configured to transmit the timing information utilizing a Precision Time Protocol (PTP) message sent via a packet taking a plurality of blocks.

6. The apparatus of claim 1, wherein the circuitry configured to transmit the timing information utilizing a plurality of subsequent specific blocks.

7. The apparatus of claim 1, wherein the transmitted blocks utilize a Metro Transport Networking (MTN).

8. A node comprising:
   a clock; and
   a circuit configured to
      detect a specific block in transmitted blocks, wherein each block in the transmitted blocks is encoded based on a line code, and sample an output of the clock to determine a timestamp reference based on detection of the specific block that has an operational code (O code) denoting timing transfer, and
      cause transmission of timing information based on the timestamp reference.

9. The node of claim 8, wherein the specific block is a control block.

10. The node of claim 8, wherein the specific block is a control block that is used for Operations, Administration, and Maintenance (OAM).

11. The node of claim 8, wherein the circuit is further configured to transmit the timing information utilizing a Precision Time Protocol (PTP) message.

12. The node of claim 8, wherein the circuit is further configured to transmit the timing information utilizing a Precision Time Protocol (PTP) message sent via a packet taking a plurality of blocks.

13. The node of claim 8, wherein the circuit is further configured to transmit the timing information utilizing a plurality of subsequent specific blocks.

14. A method comprising:
   detecting a specific block in transmitted blocks, wherein each block in the transmitted blocks is encoded based on a line code, and sampling an output of a clock to determine a timestamp reference based on detection of the specific block that has an operational code (O code) denoting timing transfer; and
   transmitting timing information based on the timestamp reference.

15. The method of claim 14, wherein the specific block is a control block.

16. The method of claim 14, wherein the transmitted blocks utilize Metro Transport Networking (MTN).

17. The method of claim 14, wherein the specific block is a control block that is used for Operations, Administration, and Maintenance (OAM).

18. The method of claim 14, further comprising transmitting the timing information utilizing a Precision Time Protocol (PTP) message.

19. The method of claim 14, further comprising transmitting the timing information utilizing a Precision Time Protocol (PTP) message sent via a packet taking a plurality of blocks.

* * * * *